(12) United States Patent
Hiriart

(10) Patent No.: US 11,918,899 B2
(45) Date of Patent: Mar. 5, 2024

(54) SYSTEMS AND METHODS OF PROCESSING IMAGES

(71) Applicant: NINTENDO CO., LTD., Kyoto (JP)

(72) Inventor: Laurent Hiriart, Montgeron (FR)

(73) Assignee: NINTENDO CO., LTD., Kyoto (JP)

( * ) Notice: Subject to any disclaimer, the term of this patent is extended or adjusted under 35 U.S.C. 154(b) by 312 days.

(21) Appl. No.: 17/385,574

(22) Filed: Jul. 26, 2021

(65) Prior Publication Data

US 2023/0032965 A1 Feb. 2, 2023

(51) Int. Cl.
*A63F 13/52* (2014.01)
*A63F 13/25* (2014.01)
*G09G 3/20* (2006.01)

(52) U.S. Cl.
CPC .............. *A63F 13/52* (2014.09); *A63F 13/25* (2014.09); *G09G 3/20* (2013.01); *G09G 2320/0247* (2013.01); *G09G 2320/0257* (2013.01); *G09G 2320/046* (2013.01); *G09G 2340/10* (2013.01)

(58) Field of Classification Search
CPC .......... A63F 13/52; A63F 13/25; G09G 3/20; G09G 2320/0247; G09G 2340/10
See application file for complete search history.

(56) References Cited

U.S. PATENT DOCUMENTS

| | | | | |
|---|---|---|---|---|
| 5,867,166 A | * | 2/1999 | Myhrvold | G06T 15/04 345/649 |
| 10,623,683 B1 | * | 4/2020 | Marchya | H04N 21/4318 |
| 2010/0271512 A1 | * | 10/2010 | Garten | H04N 5/232 382/284 |
| 2011/0211732 A1 | * | 9/2011 | Rapaport | G06F 3/1454 382/173 |
| 2011/0254976 A1 | * | 10/2011 | Garten | G06F 3/1454 348/E5.037 |
| 2016/0063954 A1 | * | 3/2016 | Ryu | G09G 3/20 345/589 |
| 2018/0144507 A1 | * | 5/2018 | Leblanc | G06T 1/20 |
| 2018/0304151 A1 | * | 10/2018 | Hicks | G09G 5/395 |
| 2019/0080670 A1 | * | 3/2019 | Jung | G09G 3/20 |
| 2020/0051481 A1 | * | 2/2020 | Masarik | G09G 5/028 |
| 2020/0105223 A1 | * | 4/2020 | Ishihara | G09G 3/36 |
| 2020/0219464 A1 | * | 7/2020 | Callway | G09G 5/10 |
| 2022/0114701 A1 | * | 4/2022 | Liu | H04N 23/951 |
| 2022/0148256 A1 | * | 5/2022 | Liu | G06T 3/4069 |
| 2023/0032965 A1 | * | 2/2023 | Hiriart | A63F 13/25 |

OTHER PUBLICATIONS

Barrio, "Study of the techniques for emulation programming", Computer Science Engineering—FIB UPC, 152 pages, Jun. 18, 2001.

* cited by examiner

*Primary Examiner* — Chase E Leichliter
(74) *Attorney, Agent, or Firm* — Nixon & Vanderhye P.C.

(57) ABSTRACT

A computer system is provided that generates images based on execution of an application program such as a video game. When required, images are generated by blending the image data of two successively generated images, with one of the images (e.g., the current or previous image) having a blend factor applied thereto. After a threshold number of images has been blended in this manner, the process switches to applying the blend factor to the other one of the images.

20 Claims, 17 Drawing Sheets

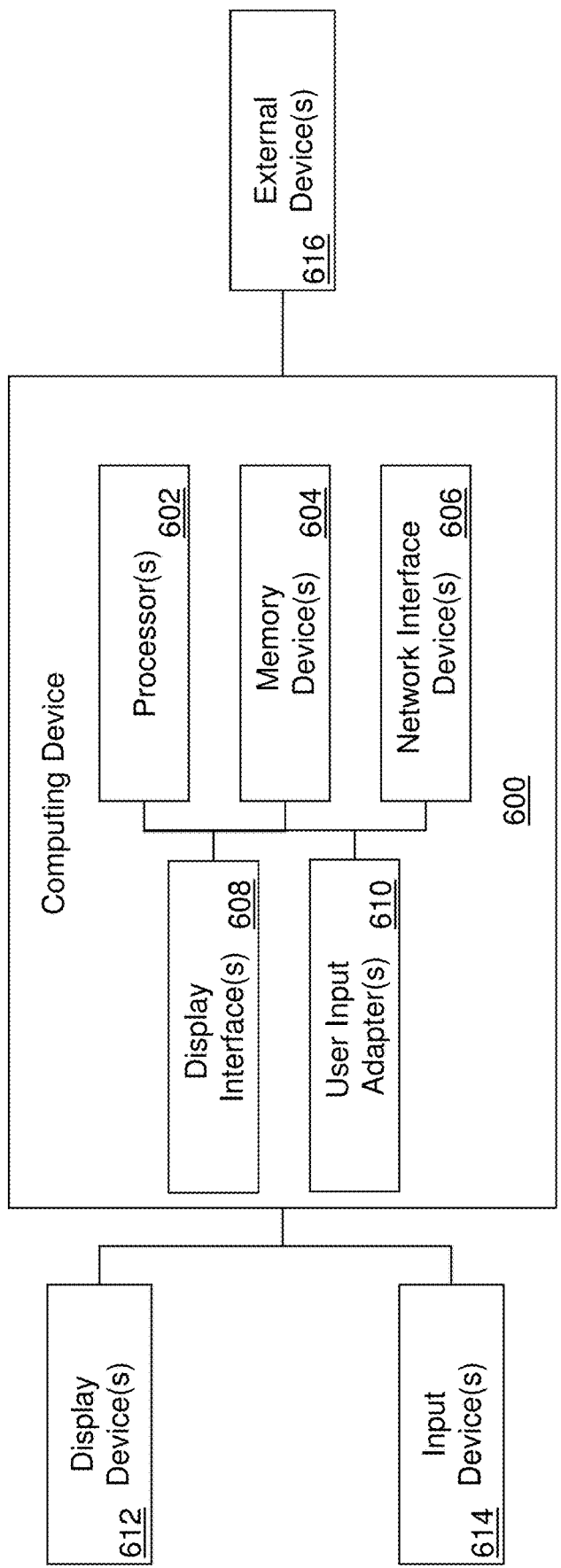

SYSTEMS AND METHODS OF PROCESSING IMAGES

TECHNICAL OVERVIEW

The technology described herein relates to processing, or post-processing, images that are to be displayed on a display screen. More particularly, the technology described herein relates to techniques for addressing or counteracting screen burn-in, image persistence, or image retention that can occur when displaying images on display screens.

INTRODUCTION

Image persistence is a problem that sometimes occurs when the same image is displayed on a display screen over a period of time. For example, image persistence can occur when the title of a presentation remains displayed in the same area of the display screen over a number of minutes. Image persistence can be temporary or can be more permanent in nature.

Accordingly, it will be appreciated that new and improved techniques, systems, and processes are continually sought after for addressing these and other technical problems.

SUMMARY

In certain example embodiments, a computer system is provided that includes a display device and a processing system. The processing system is configured, based on computer instructions, to execute a video game application where image data generated from the video game is used to output images to the display device for display thereon. When required, images for the current frame that is to be displayed are generated based on blending the image data of a prior frame with the image data of the current frame, wherein a blend factor is applied to the image data of a prior frame. After generating at least a threshold number of images by blending with the blend factor applied to the image data of a prior frame, the images that are generated are switched so that image data for a current frame is blended with image data of a prior frame, with the blend factor being applied to the image data of a current frame. The image generation technique can then switch back and forth for how the images are blended every interval threshold.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 2A-2J each show three different images from a sequence of images generated by a game program according to certain example embodiments;

FIG. 6 shows an example computing device that may be used in some embodiments to implement features described herein.

DETAILED DESCRIPTION

In the following description, for purposes of explanation and non-limitation, specific details are set forth, such as particular nodes, functional elements, techniques, protocols, etc. in order to provide an understanding of the described technology. It will be apparent to one skilled in the art that other embodiments may be practiced apart from the specific details and examples described below. In certain instances, detailed descriptions of well-known methods, systems, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Figure 3:
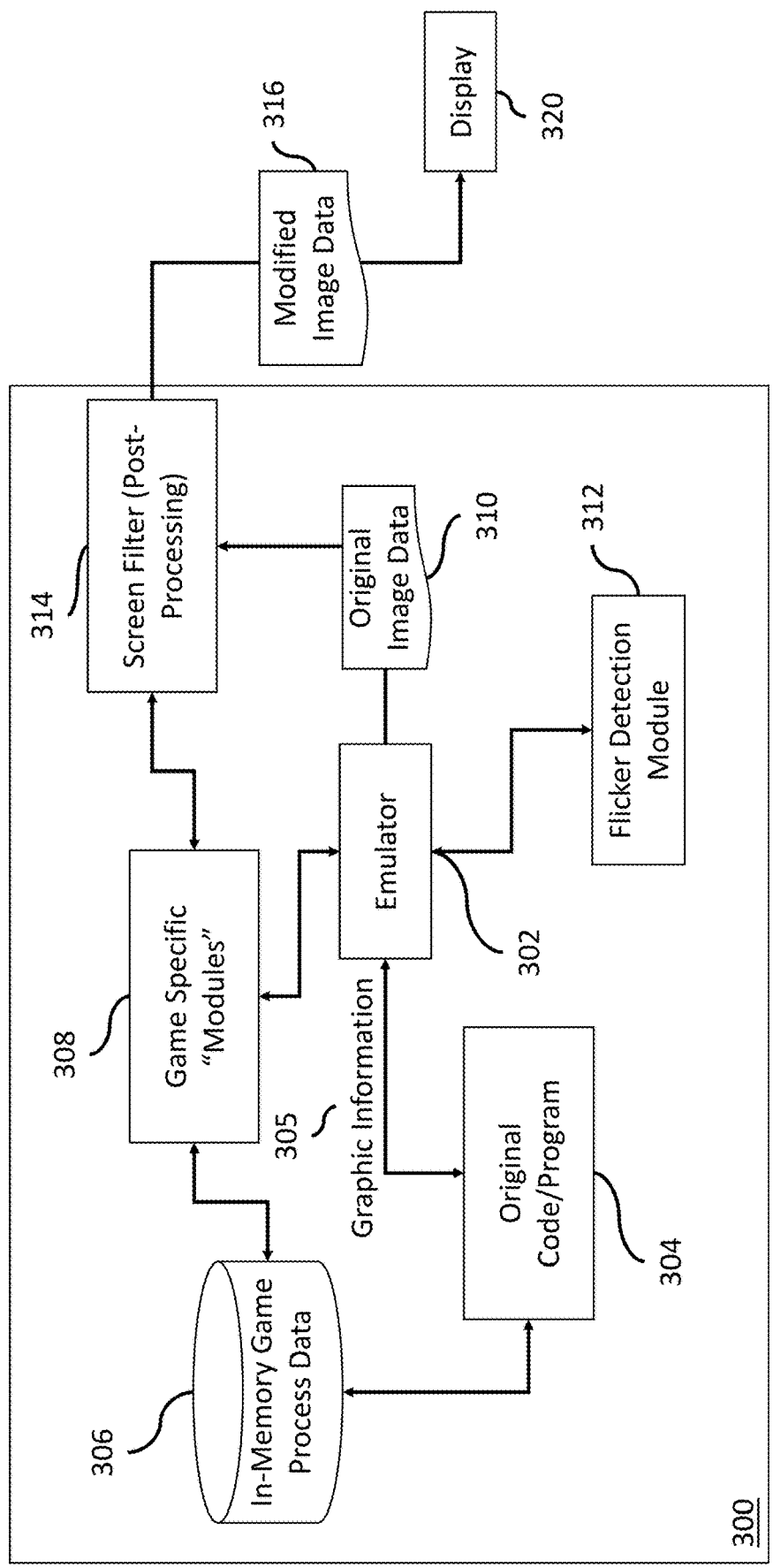
FIG. 3 is a block diagram of an example computer system that is used to implement an example image modification technique according to certain example embodiments.
Figure 4:
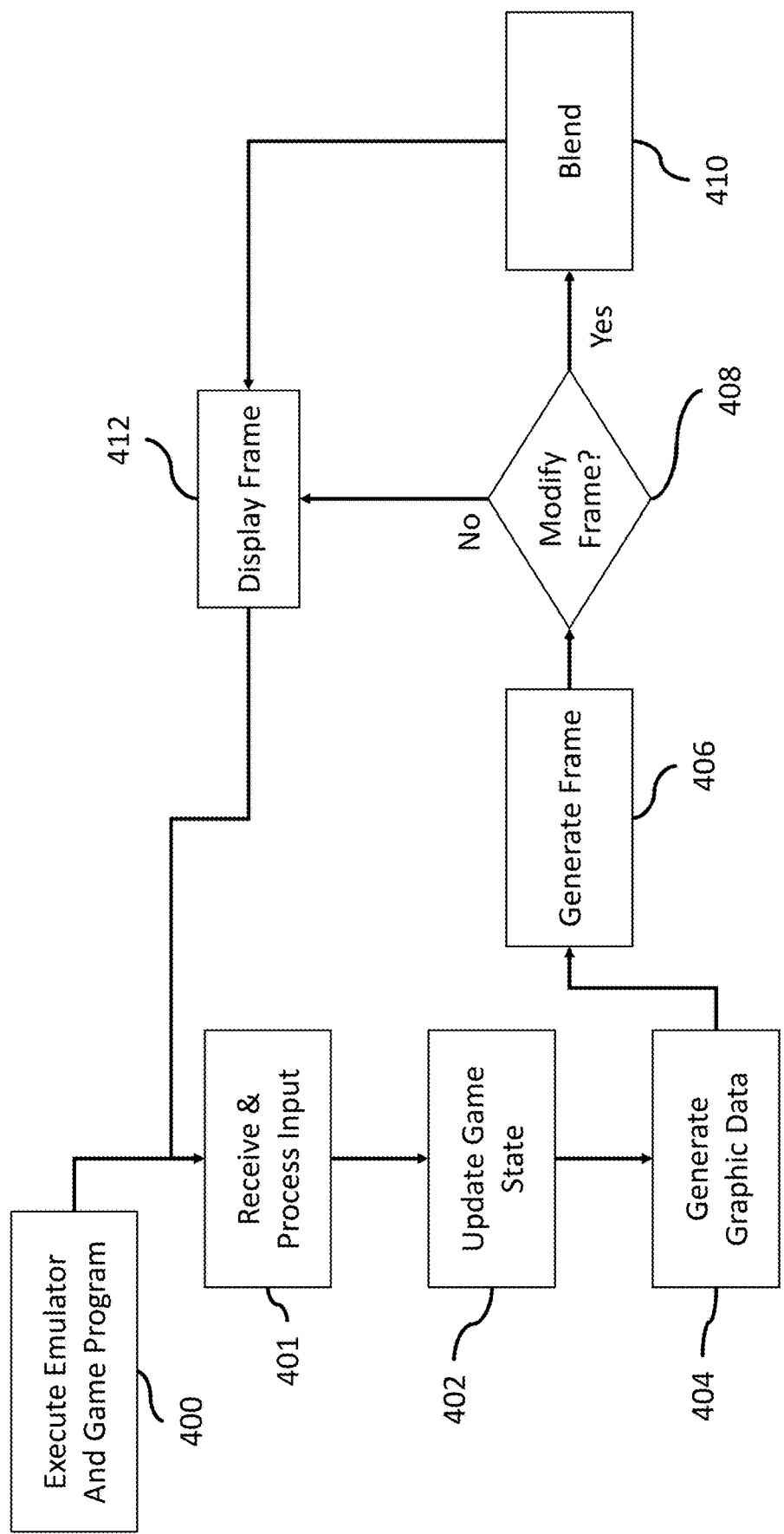
FIG. 4 is a flowchart that shows an example process that may be executed by the computer system shown in FIG. 3.
Figure 5:
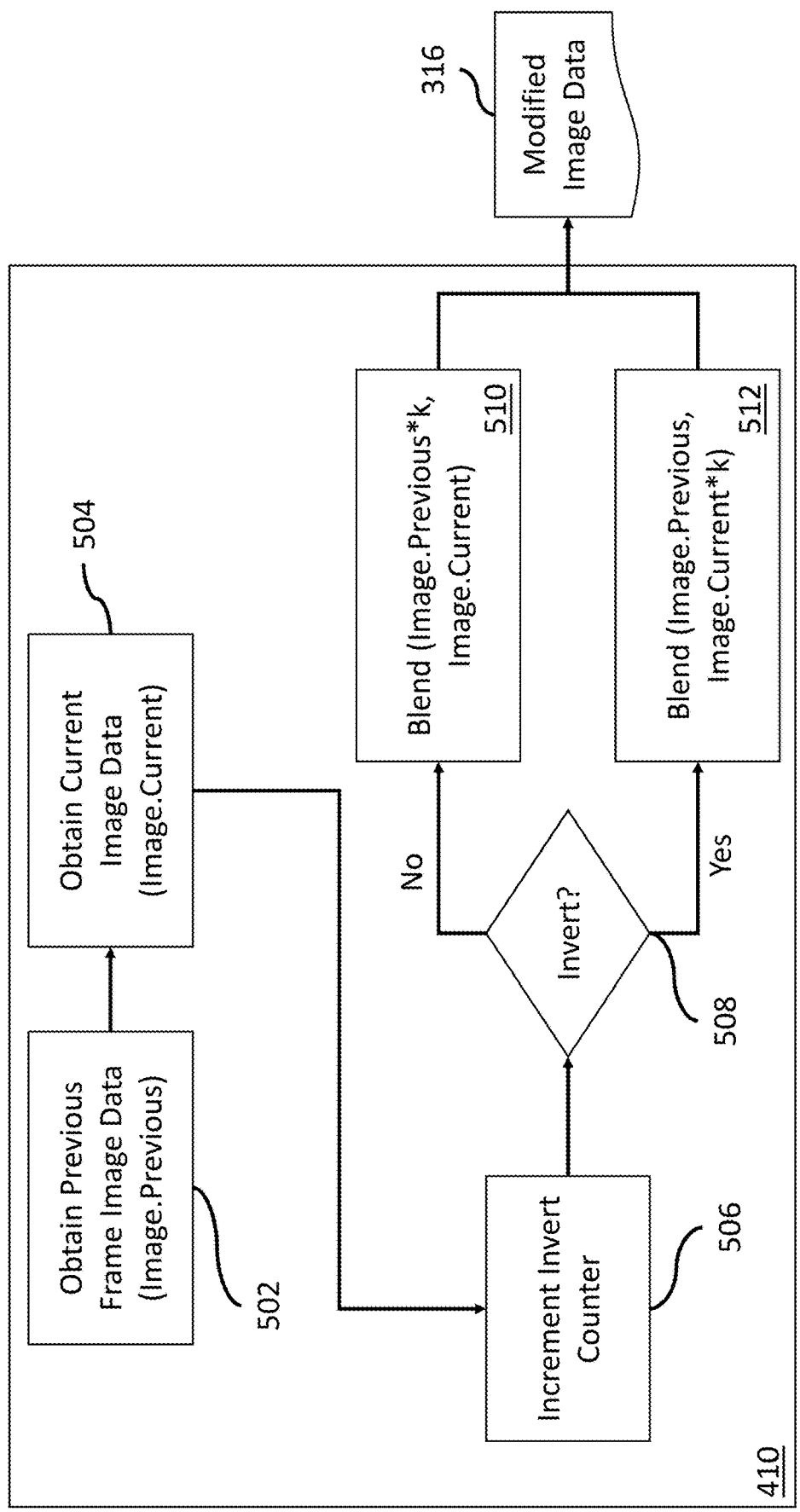
FIG. 5 is a flowchart of a process that is used to modify images that are produced by the process shown in FIG. 4.

In many places in this document, including but not limited to the description of FIGS. 3-5, software modules, software components, software engines, and/or actions performed by such elements are described. This is done for ease of description; and it should be understood that, whenever it is described in this document that a software module or the like performs any action, the action is in actuality performed by underlying hardware elements (such as a processor, hardware circuit, and/or a memory device) according to the instructions that comprise the software module or the like. Further details regarding this are provided below in, among other places, the description of FIG. 6.

Overview

A computer system is provided that modifies images produced by a software application, such as, for example, a game engine or an emulator application program. An original image that is produced is modified by blending the image produced for a current frame (a first image) with the image generated for a prior frame (a second image). The first and second images are blended (e.g., averaged) together, with one of the first and second images being modified by a blend factor (k). Which one of the first and second images that is modified by the blend factor switches after a threshold number of images have been displayed. By switching which image is modified by the blend factor, the techniques here can both address image persistence while also substantially maintaining the original image (e.g., that was produced by the game engine or game program). The switch can occur every 60 frames (e.g., assuming images are displayed at a rate of 60 frames per second), every 240 frames (e.g., every 4 seconds), or other periods. The techniques discussed herein can be used to alleviate or address problems related to image retention that may occur in display devices.

Figure 1A:
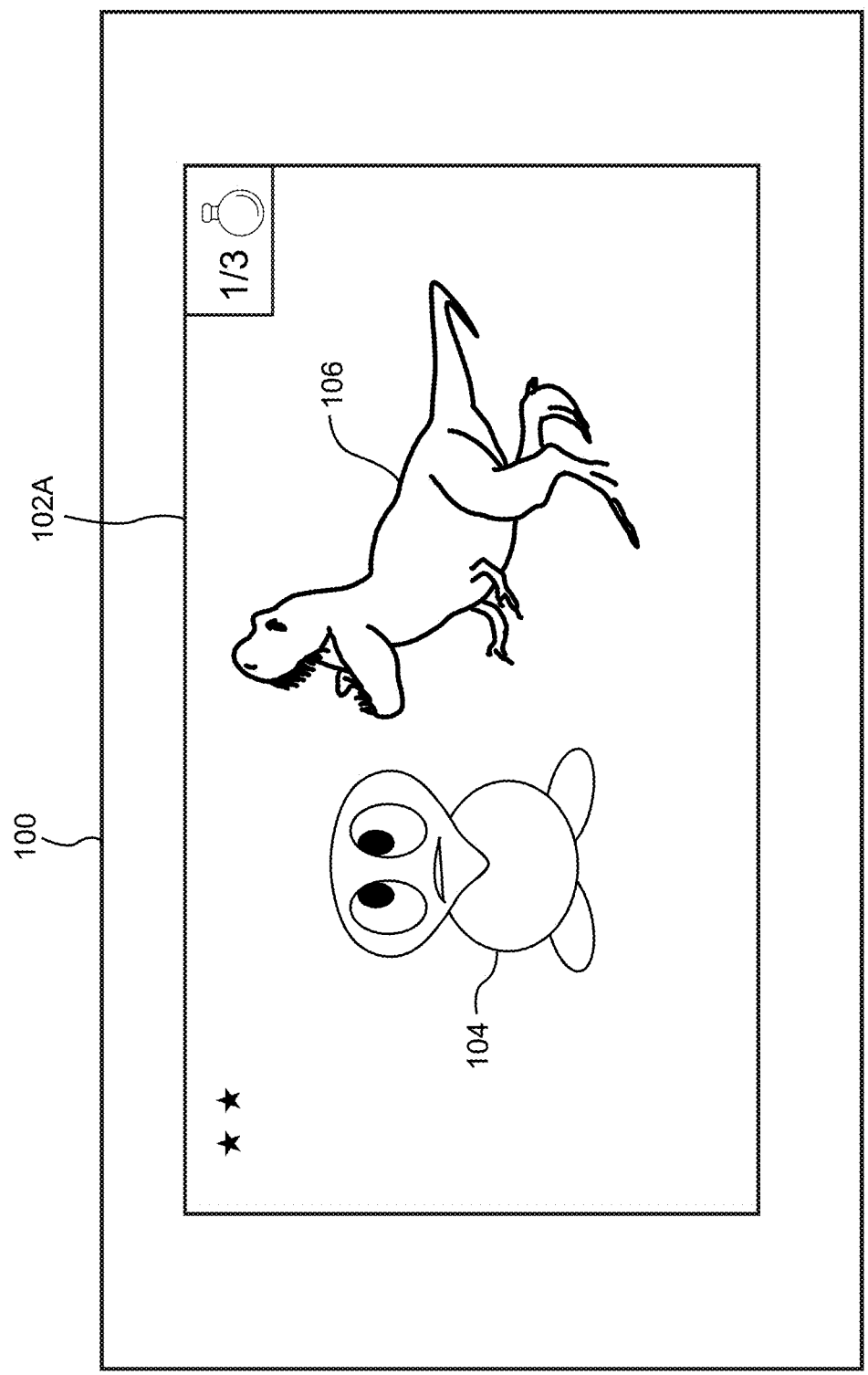
FIGS. 1A-1C show an example series of images that are displayed on a display screen during executing a game program according to certain example embodiments.
Figure 1B:
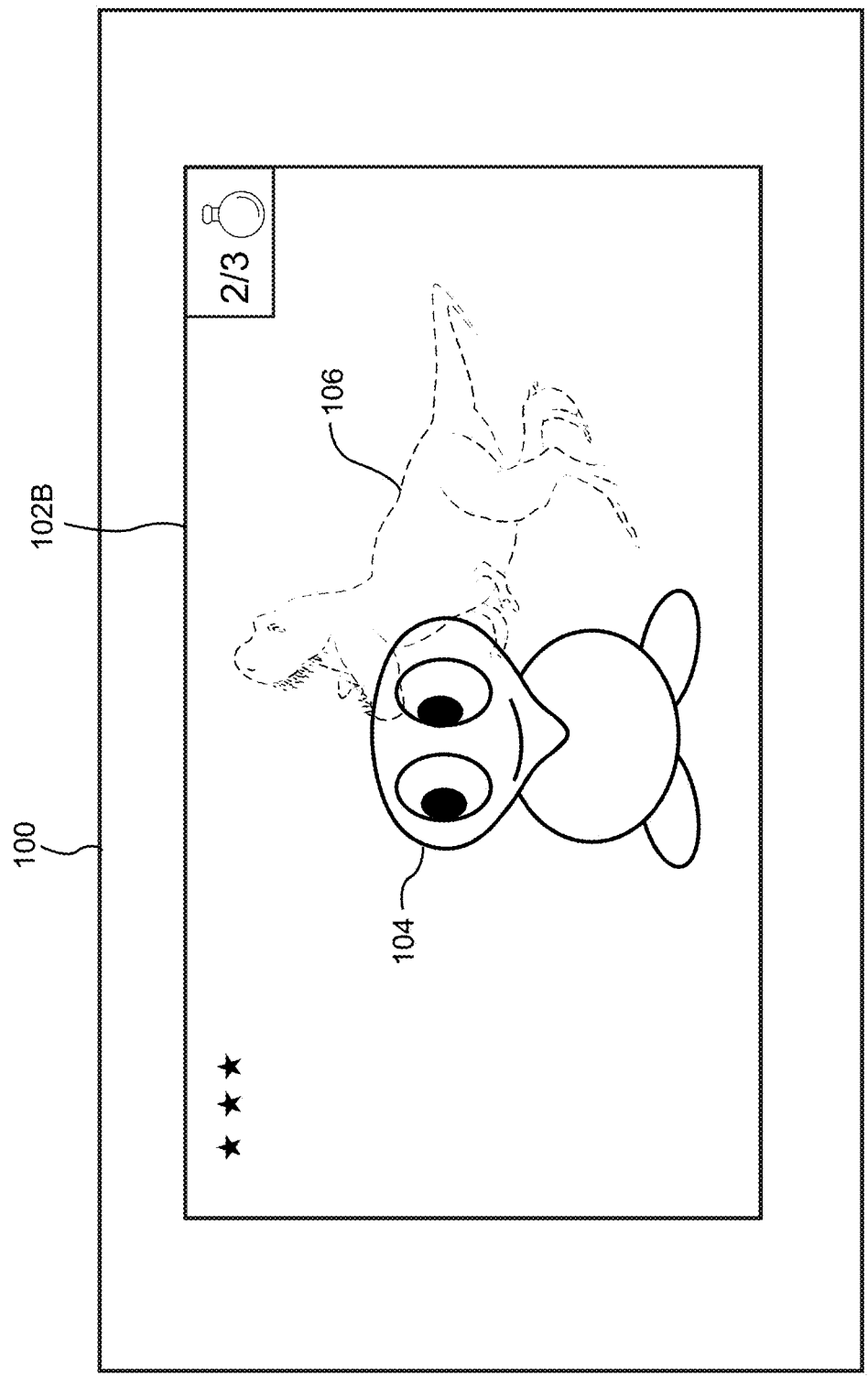
Figure 1C:
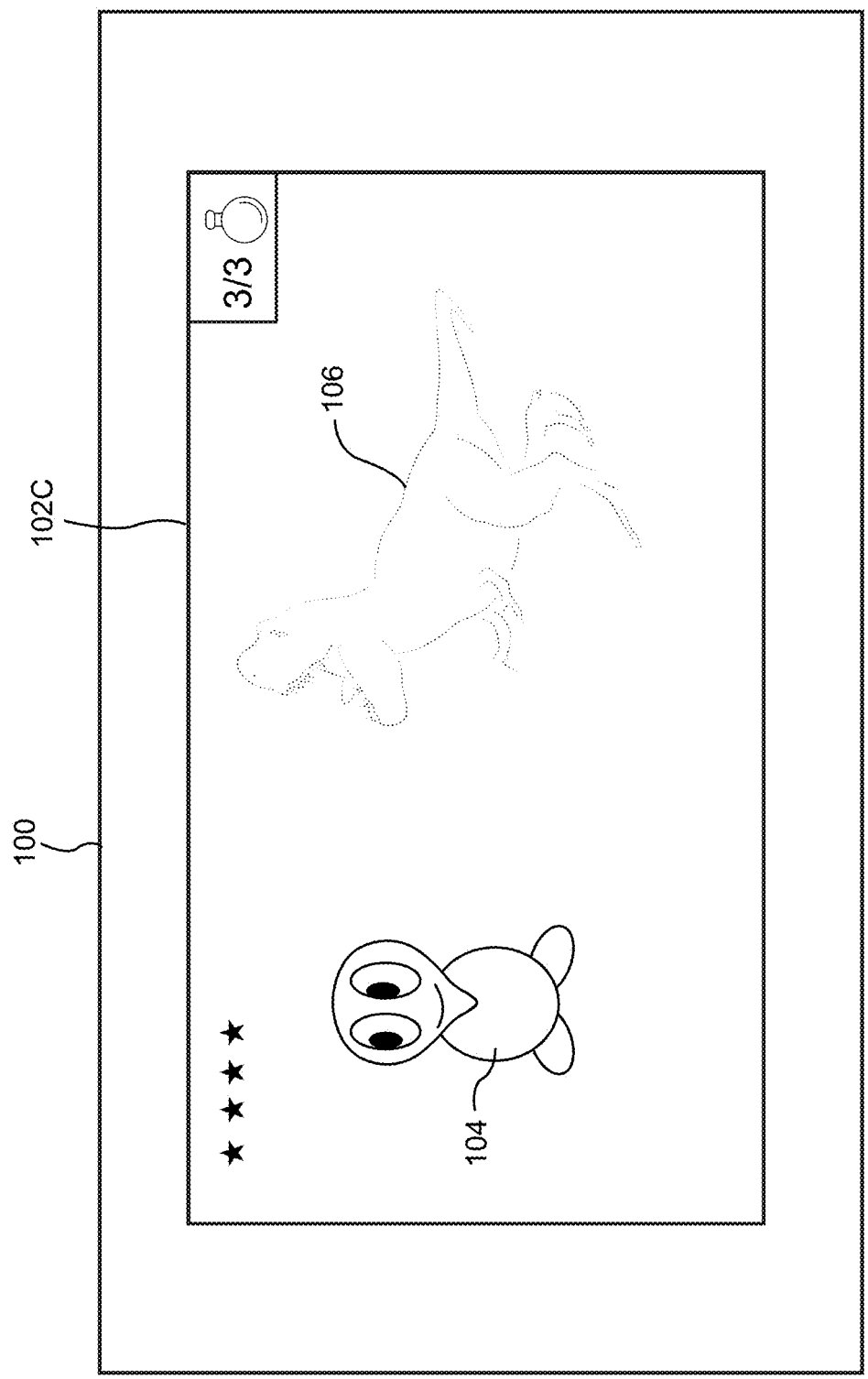

Description of FIGS. 1A-1C

FIGS. 1A-1C show an example series of images displayed on a display screen during execution of a game program according to certain example embodiments.

Different techniques have been used in video games in order to achieve different visual effects. For example, video games have previously used techniques to cause virtual objects within the video game to flicker. This visual effect could be used show damage caused to a virtual object (like a boss character), invulnerability to a character, or other game play elements that may have been present within the video game. In sprite based graphic systems this may have been achieved by displaying the sprite within a first image frame, not displaying it in the second, but redisplaying it within the third. The end result over seconds of gameplay would be to see the sprite flickering and could then be repeated for as long as needed within the video game. However, some types of visual effects, such as the flickering visual effect, can have an adverse impact on display devices that are used to display such images. For example, by causing image retention or even screen burn in.

FIGS. 1A-1C are provided to illustrate an example of the flickering effect discussed above—and the potential problems associated with image retention. In each of the FIGS. 1A-1C game objects, 104 and 106, are shown. Game object 106 is controlled to flicker by changing from being displayed to not displayed every other frame. As noted above, such flickering may be used to provide a game effect that the object in invulnerable, damaged, or to represent some other state of the game object.

In FIG. 1A, a first image frame 102A is produced by a video game program and is displayed on a display device 100 that is coupled to an example computer system (such as computer system 300). First image frame 102A includes the first game object 104 and the second game object 106. Either, both, or neither of the video game objects 102 and 104 may be controllable by a user of the computer system and player of the video game.

In FIG. 1B, a second image frame 102B is displayed on display 100. In the second image frame 102B, the first game object 104 has moved and the second game object 106 is no longer displayed (e.g., it is invisible). The sequence shown in FIGS. 1A and 1B may continue for many more frames (e.g., hundreds or thousands of frames assuming images are displayed at 60 frames per second), with the second object 106 flickering (e.g., at the same position within each image frame) while the first game object 104 moves (or does not) to different locations within each image frame.

In such a scenario, if the flickering process for the second game object 106 is maintained, then the display device that is being used to display the generated images may develop an image persistence or image retention effect where the second game object 106 is faintly displayed—even when it is no longer actually included within the image that is being produced by the video game program. This is shown in FIG. 1C.

In FIG. 1C, the second game object is supposed to be no longer present within the image frame 102C that is being displayed—or subsequent image frames. However, due to the repeated displaying of the second game object 106 at the same position on the display device may have caused an image retention effect to develop in the display device. This may be caused, as discussed below, by the display device gradually accumulating voltage in connection with the pixels that are being used to display the second game object 106. Accordingly, the image that is produced and output for display in FIG. 1C does not match the actual image that is shown on the display device.

The causes of such image persistence may be related to how certain display devices (e.g., OLED, LCD, and/or plasma displays) operate. For example, an example LCD display may display images at a refresh rate of 60 Hz. For some devices, the display may operate by switching, for each pixel, whether a positive voltage or negative voltage is used to represent white. In other words, the display may switch (or each pixel may switch) whether "+" voltage or "−" voltage represents white every 1/60 (16.7 ms). This may be referred to as LCD inversion driving herein and may be used, in connection with certain example display devices, to counteract potential display screen image retention problems that may arise from display the same image (e.g., a menu or other object) on a display over an extended period of time. But while such approaches may counter act displaying the same image over many successive frames, it may counterintuitively cause problems when certain display effects are used within video games—such as the above discussed flickering effect. This is because when an object is flickering from one frame to the next, it may be white within one image, black the next, and then white again. Thus, the switching of which voltage represents white may still cause voltage build up within the display device due to repeatedly displaying the same image every other frame. In order to at least partially address such problems (e.g., image retention), a process of blending the image values (e.g., the RGB values of each pixel, or other values) from two images together may be used. In addition, in certain embodiments, how the images are blended may be adjusted at set intervals.

Description of FIGS. 2A-2J

FIGS. 2A-2J each show three different images that are produced by a game program according to certain example embodiments. The first set of images (200A-200J) are produced according to a first blending embodiment during execution of an example game application program. The second set of images (220A-220J) are produced without blending (e.g., without further modification) during execution of the example game application program. The third set of images (240A-240J) are produced according a second blending embodiment during execution of the example game application program. Each of the images shown in FIGS. 2A-2F illustrate three different versions of a first sequence of images. Specifically, six images 200A-200F (and likewise for 220A-220F and 240A-240F) are generated and shown in sequence, with each image being shown every, for example, 1/60 of a second (60 image frames per second) on a display device during game play. The images in FIGS. 2G-2J illustrate three different versions of a second sequence of images and illustrate how an aspect of the second blending embodiment operates.

Each of the images shown within each of FIGS. 2A-2J correspond to the same gameplay of a game program that is executing and being played by a user. In the game, a first object 202 is displayed over a second object 204, with the second objecting varied (e.g., in color or brightness, etc.) during gameplay to provide for a flickering visual effect within the video game.

Images 220A-220J are examples of images produced by video game program 304 or emulator 302. These images may not be subject to the post-processing that is discussed in connection with the screen filtering module 314 and/or further modified in accordance with step 410 of FIG. 4. In these images, object 204 is not shown or made invisible in images 220B, 220D, 220F, 220H, and 220J. This causes a flickering effect when displayed in sequence with images 220A, 220C, 220E, and 220G at a rate of 30, 60, etc. per second. As discussed herein this type of flickering visual effect may eventually cause image retention in display devices (or certain types of display devices such as LCDs) by, for example, a gradual voltage accumulation.

The image sequence shown in 200A-200J is provided as an example of a technique that at least partly address image retention problems. In particular, the image that is generated (e.g., from the emulator or the game program) may be modified by blending it with the immediately previous image. As discussed in connection with FIG. 5, one of the images (the previous or the current image) is further modified by a blend factor "k" as part of the blending.

Further, which one of the two images that is modified by the factor k alternates at every set interval (N). In the example shown in images 200A-200J, the interval N is set at two. In other words, the image (the current or prior image) that is modified by k will switch every 2 frames. How images 200A-200F are created and displayed in comparison to the generated frames (which correspond to 220A-220J) is shown in table 1 below.

TABLE 1

| | FIG. | | | | | |
|---|---|---|---|---|---|---|
| | 2A | 2B | 2C | 2D | 2E | 2F |
| Generated Frame | $S_1$ | $S_2$ | $S_3$ | $S_4$ | $S_5$ | $S_6$ |
| Displayed Frame | $S_1$ | $S_1*(1-k) + S_2*k$ | $S_2*(1-k) + S_3*k$ | $S_3*k + S_4*(1-k)$ | $S_4*k + S_5*(1-k)$ | $S_5*(1-k) + S_6*k$ |

Figure 2A:
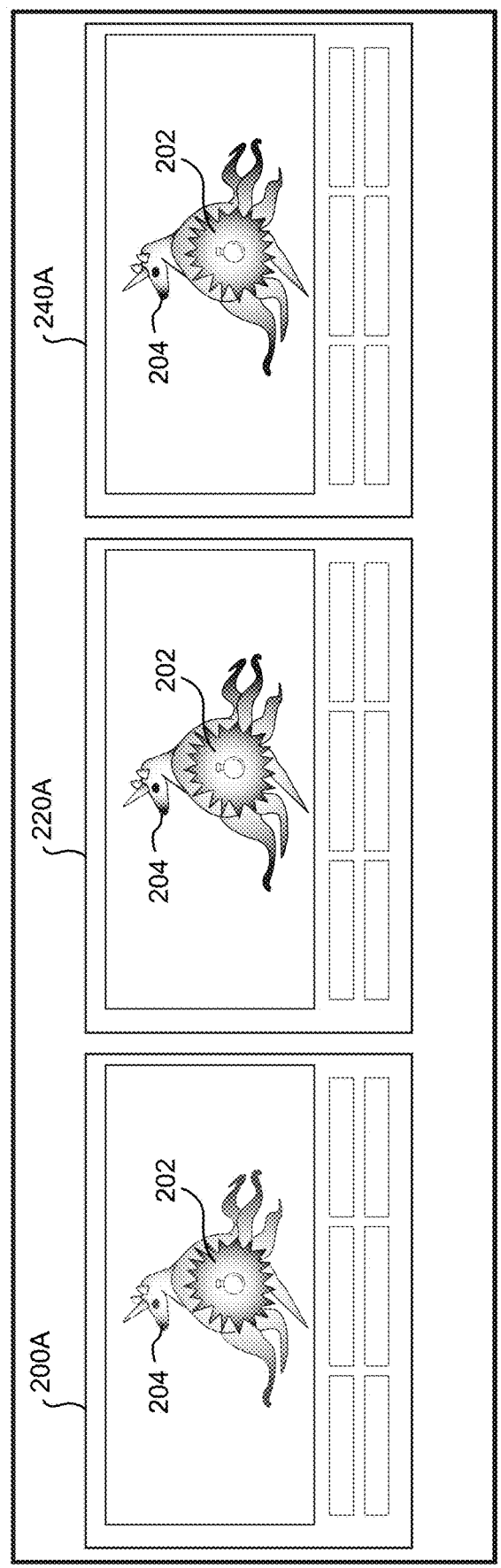
Figure 2B:
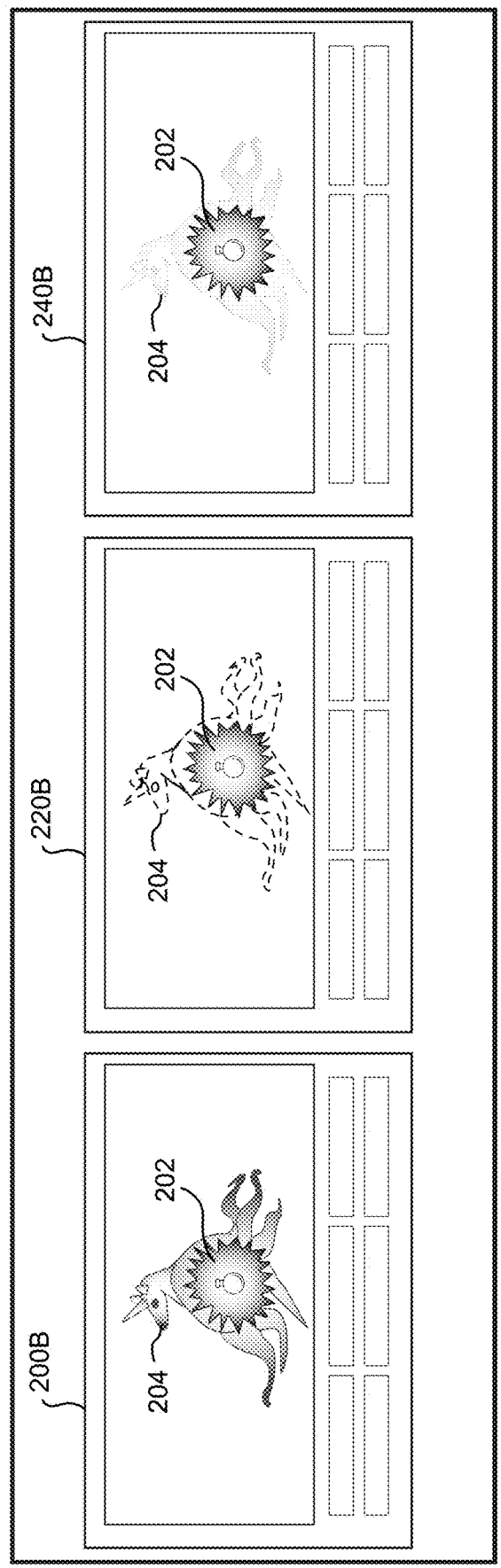
Figure 2C:
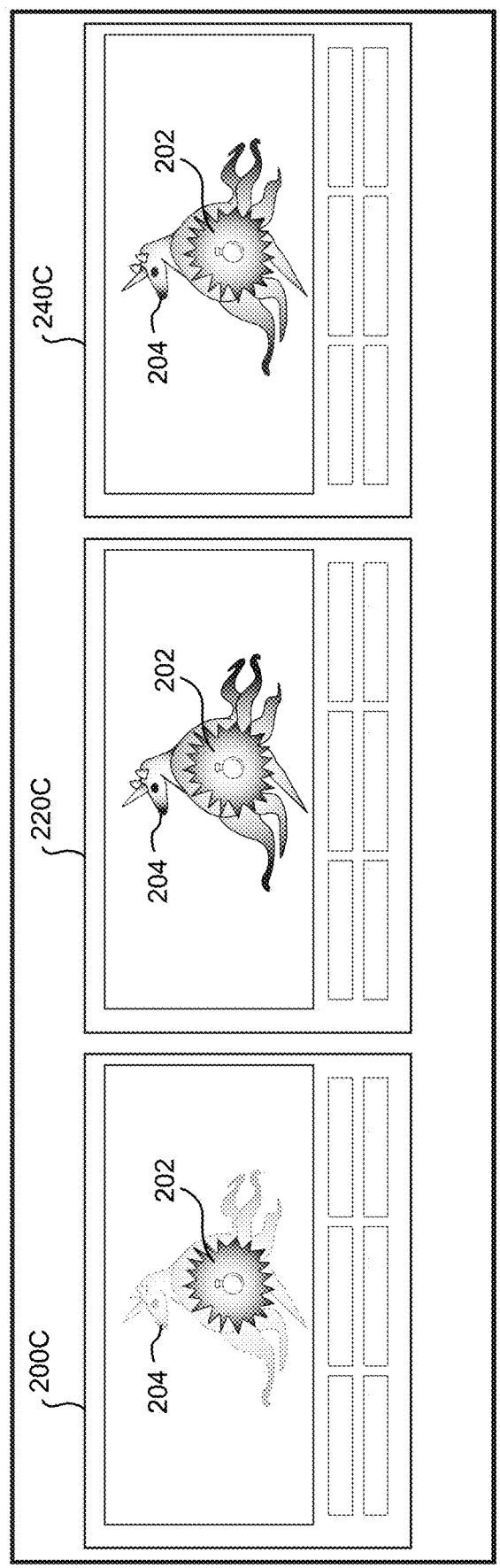
Figure 2D:
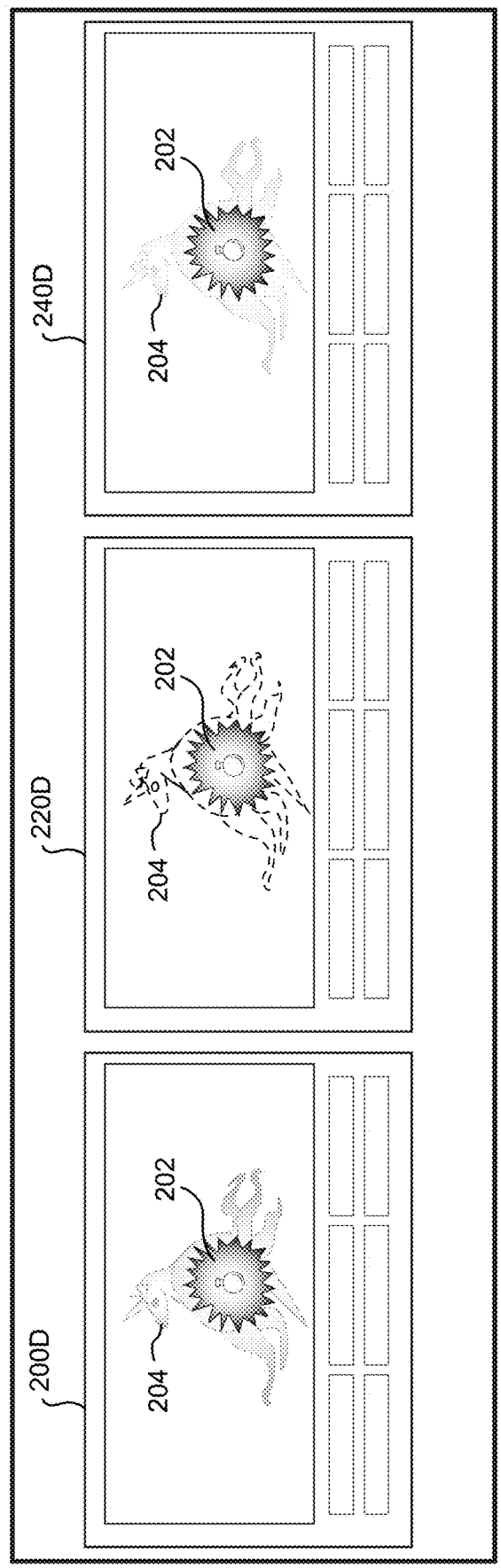
Figure 2E:
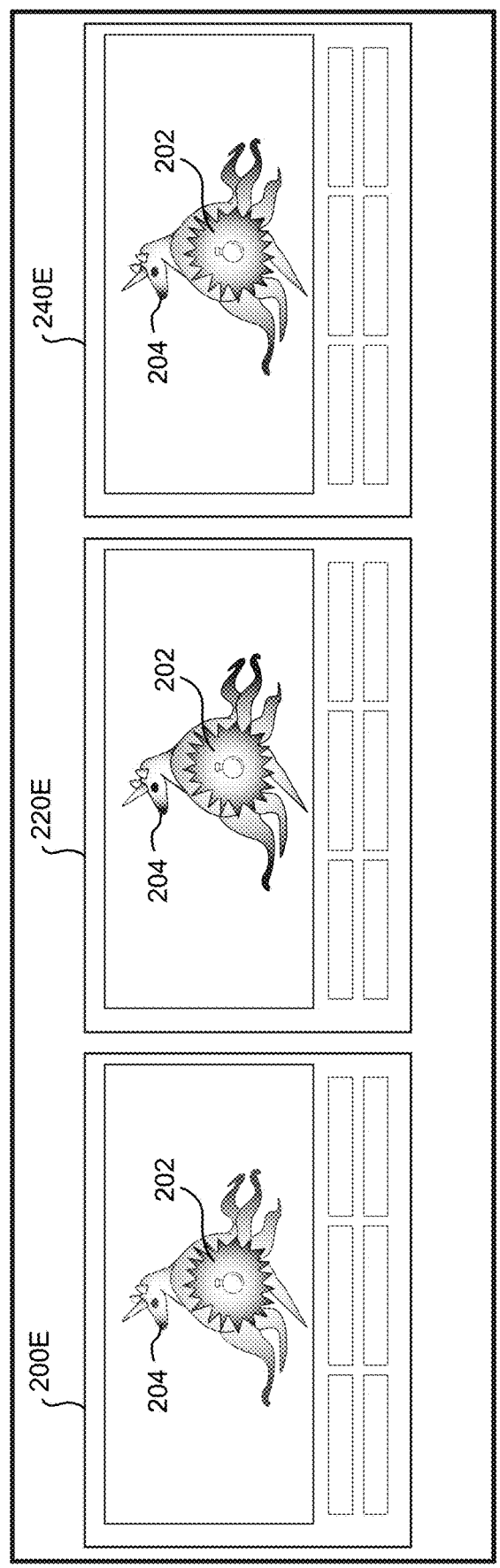
Figure 2F:
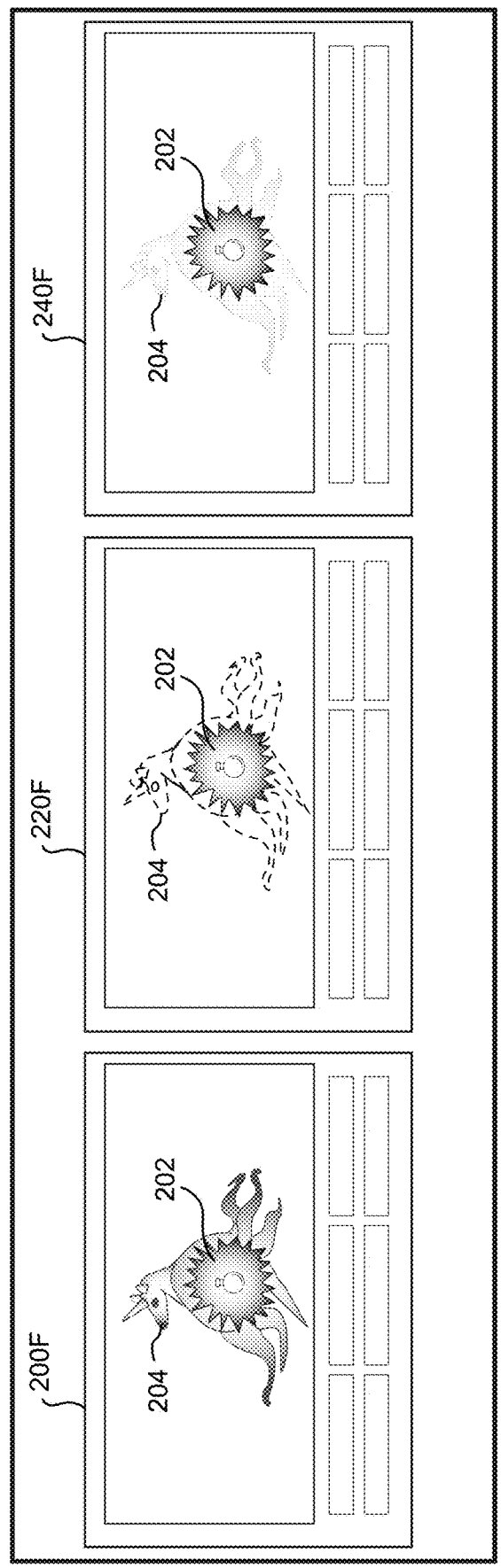
Figure 2G:
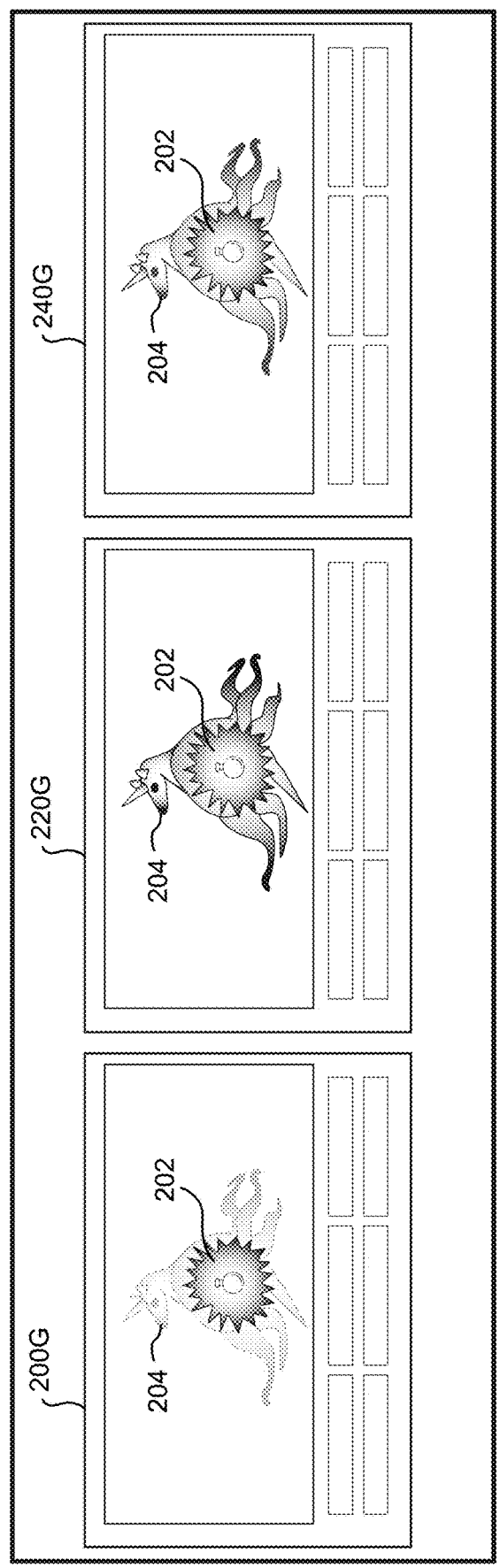
Figure 2H:
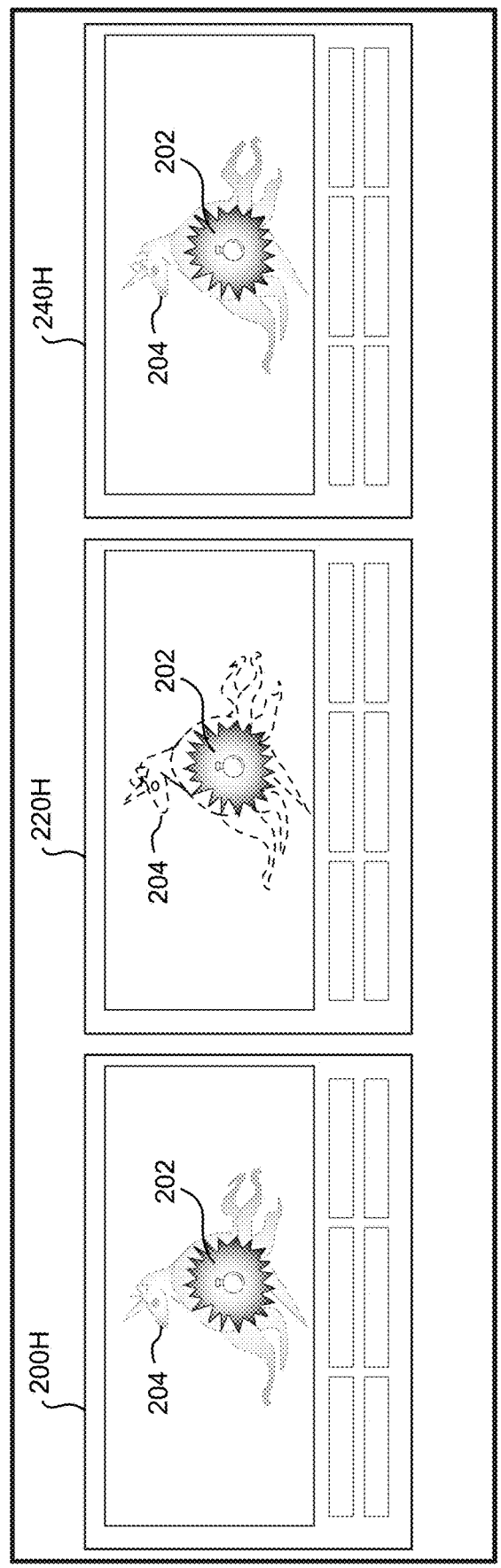
Figure 21:
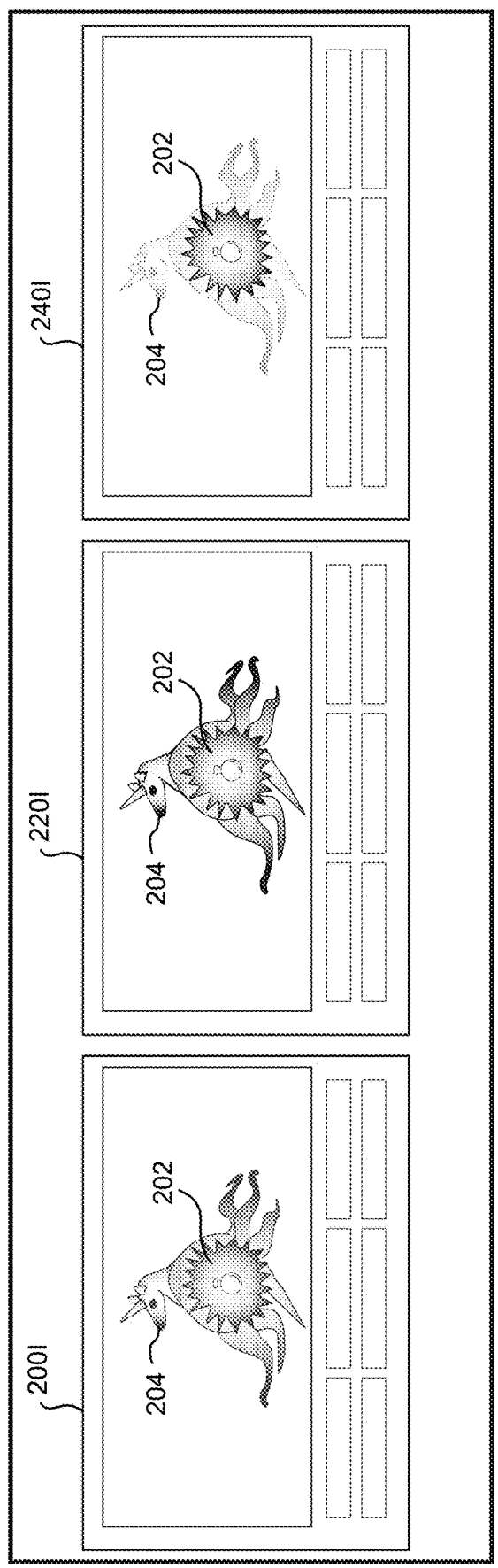
Figure 2J:
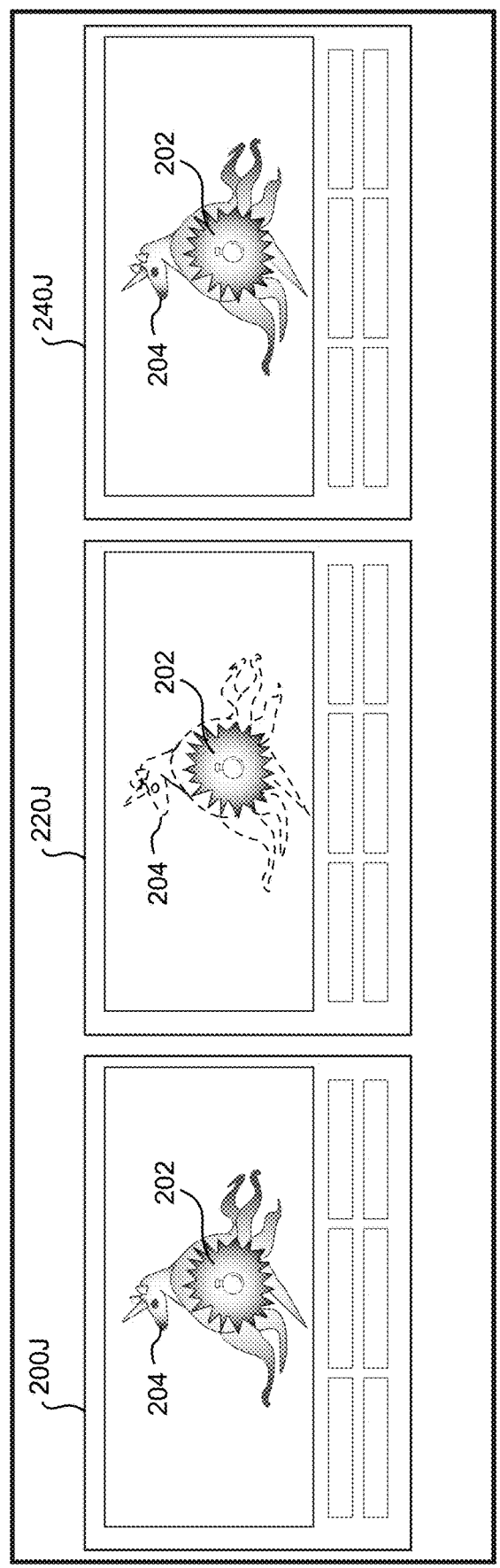

The blending of the two images may be performed according to the following algorithm: ResultingImage(n)=PreviousImage(n)*k+CurrentImage(n)*(1−k). Where n represents a given pixel within the two source images (the current and previous) and the resulting image, with k being the blend factor applied to one of the previous and current images. In this example the blend factor is being applied to the PreviousImage and is similar to how the displayed frame is generated as shown in FIG. 2D in the above table. Using this example, if the blend factor is set to 5 percent, then, effectively, 5 percent of the pixel values of the previous image will factor in with 95 percent pixel values of the current image to generate the resulting image and its corresponding pixels. It will understood that the above discussed algorithm may referred to in the shorthand as Image1*k+Image2 herein. In other words, the inverse (1−k) may be dropped from this shorthand description as it is understood be applied to the image that the blend factor is not applied to.

By blending the images in this manner and also switching which image is blended, image retention problems may be at least partly addressed. This example embodiment may thus result in displaying images that flicker every other frame as flickering that occurs every two frames. In other words, if the original images resulted in a Black, White, Black, White sequence of images, then the modification discussed above will be closer to Black, Black, White, White for four successive frames. In this first example embodiment, some of the image elements from every generated frame may be included in the resulting frame that is displayed. However, the resulting sequence may be dissimilar to the original intent of the video game that in which the frames flickered ever frame.

Alternative intervals may be used that may also counter act potential image retention problems, while also retaining more of the original generated images. Below is an example where the interval at which blend factor is switch at every $i^{th}$ frame. In this example, the flickering is similar to that shown in images 220A-220J, but with the images in frame i and i+1 being duplicated (in addition to the blend factor of the other image). Conversely, the next switch in application of the blend factor will cause a skip of one frame.

TABLE 2

| | FIG. | | | | | | | |
|---|---|---|---|---|---|---|---|---|
| | 2A | 2B | 2C | 2D | 2G | 2H | 2I | 2J |
| Generated Frame | $S_1$ | $S_2$ | $S_3$ | $S_4$ | $S_{i-1}$ | $S_i$ | $S_{i+1}$ | $S_{i+2}$ |
| Displayed Frame | $S_1$ | $S_1k + S_2$ | $S_2k + S_3$ | $S_3k + S_4$ | $(S_{i-2})k + S_{i-1}$ | $(S_{i-1})k + S_i$ | $S_i + (S_{i+1})k$ | $(S_{i+1}) + (S_{i+2})k$ |

Note that because frame $S_{i-1}$ is similar to $S_{i+1}$ (because every other frame is the same or similar—e.g., which causes the flickering effect) that $(S_{i-1})k+S_i$ is about equal to $S_i+(S_{i+1})k$. In other words, most of generated frame $S_i$ will be displayed in two successive frames (unlike every other frame that is blended). Also note that when this occurs, that the displayed frame "lags" behind the generated frame by one frame as when frame $S_{i+2}$ is generated, most of the frame that is displayed is actually $S_{i+1}$ (with some of $S_{i+2}$ blended in). The display of the frames with catch back up when the process inverts at the end of the next interval.

It will be appreciated that which frames are duplicated as noted above may be based on how the counter is tracked. Thus, instead of $S_i$ and $S_{i+1}$ being similar, that $S_{i-1}$ and $S_i$ may be similar. In other words, frame $S_i$ may be the irregular frame instead of $S_{i+1}$. In any event, the switching and inclusion of an irregular frame may occur at defined intervals.

Different intervals for when this switch occurs may be used according to different example embodiments. Certain examples may use, for example, intervals of 240 (every 4 seconds), 720 (every 12 seconds), 3600 (e.g., every minute)—assuming 60 frames displayed per second. Of course other intervals that are lower or higher than these examples may also be used according to some embodiments. In some embodiments, the interval that is selected may be based on the nature of the image effect that is being produced by the original game code and its potential to cause image retention. For example, longer intervals may be used where the flickering is not as stark (e.g., not full black to white and back).

Description of FIG. 3

FIG. 3 is a block diagram of an example computer system that is used to implement an example image modification technique according to certain example embodiments.

Computer system 300 includes multiple components and is used to execute one or more software application programs that process input provided by a user and generate images that are displayed to the user. An example of computer system 300 is computing device 600 from FIG. 6. Commercial examples of the computer system 300 include the Nintendo Switch, Personal Computers running Windows, macOS, Linux, or other operating systems, and the NES and SNES Classic Edition consoles from Nintendo.

Computer system 300 includes an emulator module 302 (also called "emulator" herein) that is programed to emulate the hardware and/or software state of another type of computing device. Emulators allow a first computer system (computer system 300), which may be called the host, to act or behave like another computer system, which may be called the guest. This allows software that was originally designed or written to execute on computer systems that such software is not designed for. For example, a software application that is written to run in Windows may run on a Macintosh personal computer through the use of an emulator. As another example, a game written for the Nintendo Entertainment System (NES) may be executed via an emulator that is running Linux using an ARM chipset. This may be possible even though the hardware architecture of the NES is different from that provided in the system running Linux on an ARM chipset.

The emulator module 302 may be a software solution, a hardware solution, or a mix of both software and hardware. A software solution may emulate the hardware (e.g., memory, CPU, I/O, etc.) and/or software architecture (e.g., API's, operating system, etc.) for which a given application was written. As a simple example, a software program may have been written for an architecture that addressed memory using little endian notation. An emulator may be written to emulate little endian—even if the underlying memory architecture of the computer system on which the emulator is running is big endian. In other examples, if the program that is to be emulated makes use of operating system level calls (e.g., for example macOS), then the emulator may emulate those calls by accepting them and then translating them into the actual operating system that is running the emulator (e.g., Windows). In some examples, the emulator module 302 may include additional hardware elements, such as FPGAs or the like. Further discussion of emulators and the various approaches that may be used in creating or programming such applications may be found in, for example, "Study of the techniques for emulation programming" by Victor Moya del Barrio, the entire contents of which are incorporated by reference herein.

It will be appreciated that the while some of the examples discussed herein include programs that are running within emulators that the techniques for modifying or processing images may be applied to programs in non-emulated environments (e.g., that are running natively).

Returning to FIG. 3, computer system 300 also includes or stores an application program that is being emulated by emulator 302. In the case of the example shown in FIG. 3, this may be the original game program 304 that was written for a different computing device. For example, the original game program 304 may be a game for a video game console that is no longer being produced/sold. The emulator 302 may then be used to emulate that video game console for games that where written for that video game console.

The emulator 302 executes the original game code 304 and during execution thereof, game process data 306 may be written to memory of the computer system 300. This data may be the in-process game data that is produced by the game code when it is executed and may include any type of data that the game program would keep track of including game state data, character data, etc. In some examples, access to or addressing such memory may be performed via the emulator 302.

The game code 304 that is executed by the emulator 302 may generate graphic information 305 that is then passed to the emulator 302 that will then produce image 310. In some examples, the graphic information may be, for example, background data, sprite data, and other graphic data that may be produced from a game programmed for the NES. Other types of graphic information may also be output depending on the nature of the program being emulated and the computing system that the emulator 302 is emulating. In some examples, the graphic information may be a bitmap file or the like.

The emulator 302 processes the graphic information 305 and generates an image 310 that can be used to output to a display device that is coupled to the computer system 300. In some examples, the graphic information may be image 310, or may an image that is then used by the emulator 302 to create image 310. In some examples, image 310 may be a bitmap or the like. In some embodiments, the emulator 302 may also format image 310 to match the display characteristics of the display device on which the image is to be output. For example, the aspect ratio or display size of the display for which the image will be output may be set.

Computer system 300 includes one or more game specific modules 308. Each game specific module includes program code for handling special use cases that may occur when emulating a corresponding original program 304. The game specific modules 308 may directly read and/or write the in-memory game process data that is being used while the original game 304 is being emulated. Each game specific module 308 may also interface or communicate with the emulator in order to provide additional or modified data that is used by the emulator 302 when the original game program is being emulated. Game specific modules may also include game specific functionality that is used by the screen filter module 314. Note that the game specific modules can be viewed as special purpose emulators that may address specific functions and/or use cases that are specific to individual games being emulated (or subset of games). In contrast, the emulator 302 may be viewed as a more general emulator that is designed to handle most use cases for the games being emulated.

As noted above, emulator 302 may produce original image data 310, which may be, for example, a bitmap or other type of image file or image data. The original image data 310 may then be used as input to the screen filter module 314 to further process, modify, or change image 310 into modified image data 316 that may then be used to output an image to the display. As discussed in greater detail below, and in connection with FIGS. 4 and 5, the screen filter module 314 may be configured to generate modified image data 316 by blending image data 310 of a current frame with image data 310 of a previously produced frame (e.g., the frame generated immediately prior to the current frame). In certain example embodiments, the screen filter module 314 may also periodically switch how the blending is performed (e.g., every 60 frames, every 240 frames, or longer).

In certain example embodiments, the screen filter module 314 may store or read a bit field (e.g., True/False or Yes/No) that indicates whether the original frame 310 is to be modified. This bit field may be accessed or modified by the emulator 302 and/or the flicker detection module 312. In certain example embodiments, the screen filter module 314 may store a field that tracks whether the blending of the images is to be inverted (discussed in greater detail in connection with FIG. 5). In certain example embodiments, the screen filter module 314 may store or track a counter. The counter may be used to indicate for how many frames the screen filter module should be active and/or how many frames to process before inverting the blending process (e.g., at 508 in FIG. 5). Once the modified image data 316 has been produced by the screen filter module, it may then be output to a display device 320 for display thereon.

The computer system 300 may also include a flicker detection module 312 that may be used to automatically (e.g., programmatically) detect when a sequence (e.g., over multiple sequential frames) of images will be produced (e.g., image data 310) that will cause a flickering effect. As discussed herein, such circumstances may result in producing images that may lead to image retention on the display device that is displaying the images. In some examples, the flicker detection module 302 may store a sequence of images that have been produced by the emulator (e.g., multiple ones of image data 310). The flicker detection module 312 may then detect the presence of a flicker condition by determining when a sequence of images, such as that shown in FIGS. 2A-2F (e.g., in 220A-220J), are present within the sequence. In some example, the detection may include reviewing or interrogating the code of the original game program for loops (e.g., for loops, while, loops, etc.). In any event, upon detecting a flicker sequence, the flicker module 312 may then trigger the screen filter module 314 to activate and begin modifying original images 310 (e.g., as discussed in connection with FIG. 5).

Note that while an emulator is used in connection with certain example embodiments discussed herein, that other embodiments may not use an emulator and instead the game program may be run natively within the environment of the computing system 300. Accordingly, for example, each of images 200A-200J, 220A-220J, and 240A-240J may be displayed by a game program that is running natively on the computer system 300 (with images 200A-200J and 240A-240J being subject to post processing).

In some examples, the program 304 that is being executed may be a movie that is being played and the techniques herein may be applied to frames that are part of movie in order to address potential image retention problems that may occur during parts of the movie.

Description of FIG. 4

FIG. 4 is a flowchart of an example of how the computer system 300 may be programmed according to certain example embodiments. As discussed in greater detail below, the steps of the flowchart shown in FIG. 4 may be implemented in one or more of the elements or modules shown in FIG. 3.

At 400, emulator 302 and game program 304 are started and begin executing. This may include, for example, starting the emulator 302, which then loads (e.g., from memory of computer system 300) the game program within the operating context of the emulator 302.

At 401, input is received in processed. The input may be received from a user that is providing input via an input device. The input may be received from an external source (such as another computer system via a network). The input may be based on data that is stored in memory of computer system 300. The input may be based on the result of another process that has executed (e.g., an automated process that is generating input). In certain example embodiments, the input is received via the emulator 302 that may then translate or provide the input to the original game code/program. For example, if the original game code operated with a first type of user input device (e.g., a controller with joysticks), but input device being used by the user of the computer system 300 is a touch panel, then the emulator may act to translate the touch input into the type of input that is expected by the original game program 304. In other examples, the input may be provided directly to the game program 304 (e.g., without being translated by using the emulator 302 or the like).

At 402, the game state of the executing game application program is updated based at least in part on the input received and/or processed at 401. This may include, for example, moving or controlling the positions of virtual objects in a virtual game space.

At 404, graphic data is generated. In certain examples, this data corresponds to the graphic data discussed in connection 305 (e.g., that is generated or output by the game application code 304).

At 406, a frame (also called an "image frame" herein) is generated. As will be appreciated, a single frame corresponds to a single image that is to be displayed on a display device as a result of executing the game program and the corresponding emulator. When games are executed they may generate a number of frames (e.g., images) per second that are to be displayed. This is commonly referred to as frames per second (FPS). Example rates at which frames are displayed include 24, 30, 60, 120, and variations thereof. Note that the rate at which frames are generated may be different than the rates at which the frames are displayed on a display device. In certain examples, the frame that is generated at 406 may be produced by the game code 304.

Accordingly, 404 and 406 may be combined, with the produced graphic data from 404 being the same as the frame that is generated at 406. In other examples, the game program may produce graphic data (305) that the emulator 302 uses to generate an image frame.

Once the frame is generated at 406, then the process determines if the frame should be modified. Different techniques for determining if the frame should be modified may be used according to different example embodiments. In some embodiments, the game specific modules 308 may include code (e.g., a flag or bit field) that sets whether the frame should be modified. This may be set according to the state of the game that is being played. For example, certain portions of a game may be more prone, due to the nature of the images that are being generated, to causing issues related to image retention. For example, a particular stage in a game, a level in a game, or sequence in a game may be known to be problematic in terms of potentially causing image retention on display devices. Accordingly, the game specific modules 308 may be programed to recognize when such situations occur (and when they stop occurring) and set a field that instructs the process to modify the image frame created at 406.

Alternatively, or additionally, the flicker detection module 312 may be programmed, as discussed above, to automatically determine when a sequence of images have been or will be produced that may lead to image retention problems. When such a circumstance is detected, the field that instructs the process to modify the image frame created at 406 may be set accordingly.

In any event, the process determines, at 408, whether the image frame that has been generated is to be further modified. If no, then the image produced at 406 is displayed on the display device at 412. If yes, then the process proceeds to 410 where the image frame generated at 406 is blended with another image frame. In certain examples, the blending of the two frames involves averaging the image values of the two frames to get a resulting frame. The details of the blending that is performed is discussed in connection with FIG. 5.

The process then repeats by returning to 401 and may continue to repeat until the game program and/or the emulator stops executing (e.g., the user stops playing the game).

In some embodiments, the frame that is generated at 406 may be stored in memory for later access. In some embodiments, a plurality of frames are stored in a buffer. One or more of these stored frames may be used to: 1) determine whether the current frame should be modified; and/or 2) blended with the current frame (e.g., as discussed in connection with the process in FIG. 5).

Description of FIG. 5

FIG. 5 is a flowchart of a process that is used to modify images that are produced by the process shown in FIG. 4.

When the process shown in FIG. 4 determines that the current image frame is to be modified, then the process shown in FIG. 5 is performed.

At 502 and 504 the image data of the current image frame and a prior image frame is obtained. As noted above, the already generated image frames may be stored to a buffer in memory. As discussed herein, the data of these two image frames may be, for example, in a bitmap format or other format that represents the data that is used to generate the image frame that will be displayed on the display device.

At 506, a counter is incremented. Specifically, as part of the process for addressing image retention, the computer system may store a counter that is used to track a number of images that have been blended. This data may be stored in memory of the computer system. This counter is used to track how many images have been generated by applying the blend factor to the prior or current image.

At 508, the process determines whether the blending process will be inverted (512) or not (510). Inverting determines whether blend factor is applied to the current image, or the prior image. And when the invert counter reaches a threshold, the invert field (which may be a Boolean or binary value) is flipped. For example, if the invert value is true, and the threshold is meet, then the invert value will be set to false. Similarly, if the invert value is false and the threshold is meet, then the invert value will be set to true. In this manner the process can control how the two images are being blended to produce the image that is ultimately output to the display device.

If the invert value at 508 is set to false, then the process proceeds to 510 where the current image is blended with the previous image with a blend factor k applied to the prior image frame.

If the invert value at 508 is set to true, then the process proceeds to 512 where the current image is blended with the previous image with a blend factor k applied to the current frame. The blend factor k may be, for example, selected as every $1/16^{th}$ between $1/16^{th}$ and $7/16^{th}$. In the examples shown in images 200A-200J, the blend factor may be $7/16^{th}$, or about 44%. In the examples shown in images 240A-240J, the blend factor may be $3/16^{th}$ or about 19%. In some embodiments the blend factor may be between 5 and 20% or between 5% and 25% percent, or between 10% and 20%, or between 15% and 45% percent, or less than 50%.

In certain examples, the blend factor may be varied from frame to frame or may have a different blend factor applied when the process is inverted versus when it is not.

The blending of the previous image and the current image occurs on a pixel by pixel basis within the image. For example, if the RGB values of a first pixel in the current image are represented as RGB1 (r1, g1, b1), and the RGB values of the pixel at the same location in the previous image are represented as RGB2 (r2, g2, b2), then the resulting RGB values (r3, g3, b3) obtained by blending may be: r3=r1*k+r2*(1−k); g3=g1*k+g2*(1−k); b3=b1*k+b2*(1−k).

The same process may be applied to all pixels within both images to thereby generate modified image data 316, which may then be displayed on the display device. The above techniques may thus be used to at least partly address image retention problems on display devices, while also maintaining the image quality of the original image that is produced by the game or other application program.

Description of FIG. 6

FIG. 6 is a block diagram of an example computing device 600 (which may also be referred to, for example, as a "computing device," "computer system," or "computing system") according to some embodiments. In some embodiments, the computing device 600 includes one or more of the following: one or more processors 602 (also referred to as hardware processors); one or more memory devices 604; one or more network interface devices 606; one or more display interfaces 608; and one or more user input adapters 610. Additionally, in some embodiments, the computing device 600 is connected to or includes one or more display devices 612. Additionally, in some embodiments, the computing device 600 is connected to or includes one or more input devices 614. In some embodiments, computing device 600 may be connected to one or more external devices 616. As will explained below, these elements (e.g., the processors 602, memory devices 604, network interface devices 606, display interfaces 608, user input adapters 610, display devices 612, input devices 614, external devices 616) are hardware devices (for example, electronic circuits or combinations of circuits) that are configured to perform various different functions for and/or in conjunction with the computing device 600.

In some embodiments, each or any of the processors 602 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes, for example, a CPU, a GPU, and other hardware components such as memory and/or a memory controller (e.g., Northbridge), I/O controller (e.g., Southbridge), networking interfaces, and the like). In some embodiments, each or any of the processors 602 uses an instruction set architecture such as x86 or Advanced RISC Machine (ARM). In some embodiments, each or any of the processors 602 is or includes, for example, a graphical processing unit (GPU), which may be an electronic circuit designed to generate images and the like. One or more of the processors 602 may be referred to as a processing system in certain examples.

In some embodiments, each or any of the memory devices 604 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions that may be executed by one or more of the processors 602), or other type of device that performs the volatile or non-volatile storage of data and/or instructions (e.g., software that is executed on or by processors 602). Memory devices 604 are an example of non-transitory computer-readable storage.

In some embodiments, each or any of the network interface devices 606 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (e.g., IEEE 802.11), GSM, CDMA2000, UMTS, LTE, LTE-Advanced (LTE-A), and/or other short-range (e.g., Bluetooth Low Energy, RFID), mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 608 is or includes one or more circuits that receive data from the processors 602 (e.g., via a discrete GPU, an integrated GPU, a CPU executing graphical processing, or the like) that are used to generate corresponding image data based on the received data, and/or output (e.g., a High-Definition Multimedia Interface (HDMI), a DisplayPort Interface, a Video Graphics Array (VGA) interface, a Digital Video Interface (DVI), or the like) the generated image data to the display device 612, which displays the image data thereon. Alternatively or additionally, in some embodiments, each or any of the display interfaces 608 is or includes, for example, a video card, video adapter, or graphics processing unit (GPU). In other words, the each or any of the display interfaces 608 may include a processor therein that is used to generate image data. The generation or such images may occur in conjunction with processing performed by one or more of the processors 602.

In some embodiments, each or any of the user input adapters 610 is or includes one or more circuits that receive and process user input data from one or more user input devices (614) that are included in, attached to, or otherwise in communication with the computing device 600, and that output data based on the received input data to the processors 602. Alternatively or additionally, in some embodiments each or any of the user input adapters 610 is or includes, for example, a PS/2 interface, a USB interface, a touchscreen controller, or the like; and/or the user input adapters 610 facilitates input from user input devices 614.

In some embodiments, the display device 612 may be a Liquid Crystal Display (LCD) display, Light Emitting Diode (LED) display, or other type of display device. In embodiments where the display device 612 is a component of the computing device 600 (e.g., the computing device and the display device are included in a unified housing), the display device 612 may be a touchscreen display or non-touchscreen display. In embodiments where the display device 612 is connected to the computing device 600 (e.g., is external to the computing device 600 and communicates with the computing device 600 via a wire and/or via wireless communication technology), the display device 612 is, for example, an external monitor, projector, television, display screen, etc.

In some embodiments, each or any of the input devices 614 is or includes machinery and/or electronics that generates a signal that is provided to the user input adapter(s) 610 in response to physical phenomenon. Examples of inputs devices 614 include, for example, a keyboard, a mouse, a trackpad, a touchscreen, a button, a joystick, a sensor (e.g., an acceleration sensor, a gyro sensor, a temperature sensor, and the like). In some examples, one or more input devices 614 generate signals that are provided in response to a user providing an input—for example, by pressing a button or actuating a joystick. In other examples, one or more input devices generate signals based on sensed physical quantities (e.g., such as force, temperature, etc.). In some embodiments, each or any of the input devices 614 is a component of the computing device (for example, a button is provide on a housing that includes the processors 602, memory devices 604, network interface devices 606, display interfaces 608, user input adapters 610, and the like).

In some embodiments, each or any of the external device (s) 616 includes further computing devices (e.g., other instances of computing device 600) that communicate with computing device 600. Examples may include a server computer, a client computer system, a mobile computing device, a cloud-based computer system, a computing node, an Internet of Things (IoT) device, etc. that all may communicate with computing device 600. In general, external devices(s) 616 may include devices that communicate (e.g., electronically) with computing device 600. As an example, computing device 600 may be a game device that communicates over the Internet with a server computer system that is an example of external device 616. Conversely, computing device 600 may be a server computer system that communicates with a game device that is an example external device 616.

In various embodiments, the computing device 600 includes one, or two, or three, four, or more of each or any of the above-mentioned elements (e.g., the processor(s) 602, memory device(s) 604, network interface device(s) 606, display interface(s) 608, user input adapter(s) 610, display device(s) 612, input device(s) 614). Alternatively or additionally, in some embodiments, the computing device 600 includes one or more of: a processing system that includes the processors 602; a memory or storage system that includes the memory devices 604; and a network interface system that includes the network interface devices 606.

The computing device 600 may be arranged, in various embodiments, in many different ways. As just one example, the computing device 600 may be arranged such that the processors 602 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 600 may be arranged such that: the processors 602 include two, three, four, five, or more multi-core processors; the network interface devices 606 include a first network interface device that implements Ethernet and a second network interface device that implements WiFi and/or Bluetooth; and the memory devices 604 include a RAM and a flash memory or hard disk. As another example, the computing device 600 may include a SoC with one or processors 602, plural network interface devices 606, memory devices 604 that include system memory and memory for application programs and other software, a display interface 6068 that is configured to output a video signal, a display device 612 that is integrated to a housing with the mentioned and layered with a touch screen input device 614, and multiple input device 614 such as one or more joysticks, one or more buttons, and one or more sensors.

As previously noted, whenever it is described in this document that a software module or software process performs any action, the action is in actuality performed by underlying hardware elements according to the instructions that comprise the software module or software.

The hardware configurations shown in FIG. 6 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 6, (e) via other hardware arrangements, architectures, and configurations, and/or via combinations of the technology described in (a) through (e).

Technical Advantages of Described Subject Matter

In certain example embodiments, techniques are provided for addressing image retention problems when certain types of visual effects are used in connection with video games, other application programs, or situations in which images are displayed sequentially as a movie. The visual effects may provide a flickering or transparent view of an object. The techniques discussed herein allow for the images produced by the game application (or an emulator that is running the game application) to modify the images by blending a current generated image with a previously generated image. One of the images is modified by a blend factor (k). Which image is modified by the blend factor switches at a defined interval. The techniques discussed herein help to avoid accumulation of voltage within certain types of display devices (e.g., LCDs, etc.) and thus image retention problems.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 3-5, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
    a display device; and
    a processing system comprising instructions that, when executed by at least one hardware processor, cause the at least one hardware processor to perform operations comprising:
    (a) executing a game application;
    (b) generating first image data and outputting, to the display device, a first image frame for display thereon;
    (c) generating an image for a first corresponding current frame based on blending image data of a first corresponding prior frame with image data of the first corresponding current frame, wherein a blend factor is applied to the image data of the first corresponding prior frame;
    (d) based on generating at least a threshold number of images by blending with the blend factor applied to image data of prior frames, switching to generating an image for a second corresponding current frame based on blending image data of a second corresponding prior frame with image data of the second corresponding current frame, wherein the blend factor is applied to the image data of the second corresponding current frame; and
    (e) outputting, to the display device, each image generated for each current frame.

2. The computer system of claim 1, wherein the instructions are further configured to cause, when executed by the at least one hardware processor, (c) and (e) to be performed at a rate of 60 times per second.

3. The computer system of claim 1, wherein a refresh rate of the display device is the same as a rate at which each image is output to the display device.

4. The computer system of claim 1, wherein the instructions are further configured to, when executed by the at least one hardware processor, cause the at least one hardware processor to perform operations comprising:
    executing an emulator application program, wherein the game application is executed by using the emulator application program.

5. The computer system of claim 1, wherein the instructions are further configured to, when executed by the at least one hardware processor, cause the at least one hardware processor to perform operations comprising:
    determining, based on image data generated over a plurality of frames, when a flickering condition is present within the game application; and
    based on determination of the flickering condition, start performing (c)
    when no flickering condition is detected, outputting the image for the current frame without blending with image data from another frame.

6. The computer system of claim 1, wherein the threshold number of images is at least 60.

7. The computer system of claim 6, wherein the threshold number of images is at least 240.

8. The computer system of claim 1, wherein the blend factor is between 5% and 20%.

9. A non-transitory computer readable storage medium storing instructions for use with a computer system, the computer system including at least one hardware processor that is coupled to a display device, the stored instructions comprising instructions that are configured to cause the at least on hardware processor to perform operations comprising:
    (a) executing a game application;
    (b) generating first image data and outputting, to the display device, a first image frame for display thereon;
    (c) generating an image for a current frame based on blending image data of a prior frame with image data of the current frame, wherein a blend factor is applied to the image data of a prior frame;
    (d) based on generating at least a threshold number of images by blending with the blend factor applied to image data of a-prior frames, switching to generating an image for a current frame based on blending image data of a prior frame with image data of the current frame, wherein the blend factor is applied to the image data of a current frame; and
    (e) outputting, to the display device, each image that is generated for each current frame,
    wherein each current frame is sequentially generated with a corresponding prior frame.

10. The non-transitory computer readable storage medium of claim 9, wherein the instructions are further configured to cause, when executed by the at least one hardware processor, (c) and (e) to be performed at a rate of 60 times per second.

11. The non-transitory computer readable storage medium of claim 9, wherein a refresh rate of the display device is the same as a rate at which each image is output to the display device.

12. The non-transitory computer readable storage medium of claim 9, wherein the instructions are further configured to, when executed by the at least one hardware processor, cause the at least one hardware processor to perform operations comprising:
    executing an emulator application program, wherein the game application is executed by using the emulator application program.

13. The non-transitory computer readable storage medium of claim 9, wherein the instructions are further configured to, when executed by the at least one hardware processor, cause the at least one hardware processor to perform operations comprising:
    determining, based on image data generated over a plurality of frames, when a flickering condition is present within the game application; and
    based on determination of the flickering condition, start performing (c)
    when no flickering condition is detected, outputting the image for the current frame without blending with image data from another frame.

14. The non-transitory computer readable storage medium of claim 9, wherein the threshold number of images is at least 60.

15. The non-transitory computer readable storage medium of claim 14, wherein the threshold number of images is at least 240.

16. The non-transitory computer readable storage medium of claim 9, wherein the blend factor is between 5% and 20%.

17. A method of processing images that are displayed on a display device, the method comprising:
   (a) executing, by using a computer system that includes at least one hardware processor, a game application program;
   (b) generating, by using the computer system, first image data and outputting, to the display device, a first image frame for display thereon;
   (c) generating, by using the computer system, an image for a first current frame based on blending image data of a first prior frame with image data of the first current frame, wherein a blend factor is applied to the image data of the first prior frame;
   (d) based on generating at least a threshold number of images by blending with the blend factor applied to image data of a prior frame, switching to generating, by using the computer system, an image for a second current frame based on blending image data of a second prior frame with image data of the second current frame, wherein the blend factor is applied to the image data of the second current frame; and
   (e) outputting, to the display device, each image that is generated for each current frame,
   wherein the image data of each prior frame and the image data of each current frame are sequentially generated based on execution of the game application program.

18. The method of claim 17, wherein a refresh rate of the display device is the same as a rate at which each image is output to the display device.

19. The method of claim 17, further comprising:
   executing an emulator application program, wherein the application program is a game application program and is executed by using the emulator application program.

20. The method of claim 17, wherein the blend factor is between 10% and 20%.

* * * * *